(12) United States Patent
Nasgowitz et al.

(10) Patent No.: US 9,935,852 B2
(45) Date of Patent: Apr. 3, 2018

(54) METHODS AND SYSTEMS FOR NETWORK MONITORING

(71) Applicant: General Electric Company, Schenectady, NY (US)

(72) Inventors: Mark Nasgowitz, Milwaukee, WI (US); Bruce Arnold Friedman, Jasper, GA (US); Robert Joseph Alberte, Jr., Oconomowoc, WI (US); Paul Robert Brozowski, Germantown, WI (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 15/174,570

(22) Filed: Jun. 6, 2016

(65) Prior Publication Data
US 2017/0353366 A1 Dec. 7, 2017

(51) Int. Cl.
*H04L 12/26* (2006.01)
*H04L 12/24* (2006.01)

(52) U.S. Cl.
CPC ........... *H04L 43/045* (2013.01); *H04L 41/06* (2013.01); *H04L 41/0803* (2013.01); *H04L 41/12* (2013.01)

(58) Field of Classification Search
CPC ........ H04L 67/42; H04L 41/50; G06F 9/5055
See application file for complete search history.

(56) References Cited

U.S. PATENT DOCUMENTS

| | | | | |
|---|---|---|---|---|
| 5,049,873 A | * | 9/1991 | Robins | H04L 45/02 340/2.1 |
| 5,623,481 A | * | 4/1997 | Russ | H04J 3/14 370/225 |
| 5,841,759 A | * | 11/1998 | Russ | H04J 3/14 370/221 |
| 5,964,837 A | * | 10/1999 | Chao | H04L 41/22 709/224 |
| 6,061,723 A | * | 5/2000 | Walker | H04L 41/0631 709/224 |
| 6,118,936 A | * | 9/2000 | Lauer | H04L 41/0631 370/244 |

(Continued)

OTHER PUBLICATIONS

International Search Report and Written Opinion for PCT/US2017/035941, dated Jul. 20, 2017, 14 pages.

*Primary Examiner* — Ranodhi Serrao
(74) *Attorney, Agent, or Firm* — Dean D. Small; The Small Patent Law Group, LLC

(57) ABSTRACT

Methods and system for network monitoring is provided. The system includes a communication circuit configured to receive network information from one or more components of a medical network for a select time period, and a controller circuit having one or more processors coupled to the communication circuit. The controller circuit is configured to determine a configuration and data usage of the medical network based on the network information at reference points along the time period of interest. The controller circuit is configured to generate a graphical representation of a topology of the medical network on a display based on the configuration of the medical network at one of the reference points. The graphical representation includes a plurality of component markers, representing the one or more components, interconnected with each other, and a visual status indicator for the one or more components based on the data usage.

16 Claims, 12 Drawing Sheets

(56) References Cited

U.S. PATENT DOCUMENTS

| | | | |
|---|---|---|---|
| 6,901,442 B1* | 5/2005 | Schwaller | H04L 43/0817 709/223 |
| 7,974,219 B2 | 7/2011 | Strahan et al. | |
| 8,108,551 B1 | 1/2012 | Goel et al. | |
| 8,185,824 B1 | 5/2012 | Mitchell et al. | |
| 2002/0103930 A1* | 8/2002 | Kamentsky | H04H 60/43 709/244 |
| 2003/0120624 A1 | 6/2003 | Poppenga et al. | |
| 2003/0163555 A1* | 8/2003 | Battou | G06F 8/65 709/223 |
| 2004/0061701 A1 | 4/2004 | Arquie et al. | |
| 2004/0117624 A1* | 6/2004 | Brandt | H04L 63/1408 713/166 |
| 2005/0108385 A1* | 5/2005 | Wechter | H04L 41/12 709/224 |
| 2005/0174972 A1* | 8/2005 | Boynton | H04L 47/10 370/337 |
| 2005/0185596 A1* | 8/2005 | Kamentsky | H04L 29/06 370/252 |
| 2006/0013169 A2* | 1/2006 | Boynton | H04L 47/10 370/337 |
| 2011/0004914 A1 | 1/2011 | Ennis, Jr. et al. | |
| 2011/0099500 A1 | 4/2011 | Smith et al. | |
| 2012/0120078 A1 | 5/2012 | Hubbard | |
| 2013/0103739 A1 | 4/2013 | Salgueiro et al. | |
| 2016/0147380 A1 | 5/2016 | Coates et al. | |

* cited by examiner

METHODS AND SYSTEMS FOR NETWORK MONITORING

BACKGROUND OF THE INVENTION

Embodiments described herein generally relate to monitoring a network using a specialized graphical user interface to manage, view, and troubleshoot the network.

The use of computer networks and devices has become widespread, and many of the advantages of such networks and devices are well-known. The networks can include multiple nodes each interconnected by a bi-directional communication link. However, when a network fault occurs, such as when a bi-directional communication link fails, the network may experience congestion, corresponding performance issues, and/or the like. For networks having a few devices (e.g., one node), the network faults are manageable. However, for large networks having multiple nodes, such as medical networks in hospitals extending multiple floors and/or buildings, the network faults can be difficult to locate and/or diagnose. Managing the configuration and multiple communication links within these large networks is conventionally done by having multiple status boxes distributed at each node throughout the network. The status boxes monitor the bi-directional communication links, when a network fault occurs an information technology (IT) technician, user, and/or the like is required to diagnose and/or reconfigure the network at the status box detecting the network fault.

BRIEF DESCRIPTION OF THE INVENTION

In an embodiment a system (e.g., for network monitoring) is provided. The system includes a communication circuit configured to receive network information from one or more components of a medical network for a select time period. The system includes a controller circuit having one or more processors coupled to the communication circuit. The controller circuit is configured to determine a configuration and data usage of the medical network based on the network information at reference points along the time period of interest. The controller circuit is further configured to generate a graphical representation of a topology of the medical network on a display based on the configuration of the medical network at one of the reference points. The graphical representation includes a plurality of component markers interconnected with each other. The plurality of component markers represent the one or more components. The graphical representation includes a visual status indicator for the one or more components based on the data usage.

In at least one embodiment a method (e.g., for network monitoring) is provided. The method includes receiving network information from one or more components of a medical network for a select time period. The method also includes determining a configuration and data usage of the medical network based on the network information at reference points along the time period of interest, and generating a graphical representation of a topology of the medical network on a display based on the configuration of the medical network at one of the reference points. The graphical representation includes a plurality of component markers interconnected with each other. The plurality of component markers represent the one or more components. The graphical representation includes a visual status indicator for the one or more components based on the data usage.

In at least one embodiment a system (e.g., for network monitoring) is provided. The system includes a communication circuit configured to receive network information from one or more components of a network for a select time period. The system includes a user interface and a controller circuit having one or more processors coupled to the communication circuit. The controller circuit is configured to determine a configuration and data usage of the network based on the network information at reference points along the time period of interest. The controller circuit is further configured to generate a graphical representation of a topology of the network on a display based on the configuration of the network at one of the reference points. The graphical representation includes a plurality of component markers interconnected with each other. The plurality of component markers represent the one or more components. The graphical representation includes a visual status indicator for the one or more components based on the data usage. The controller circuit is further configured to generate a time graph of the network based on the network information. The time graph having a time line defined by the time period of interest. The time graph includes a graphical indicator positioned along the time line. A position of the graphical indicator is based on the one of the reference points. The controller circuit is further configured to adjust a position of the graphical indicator to a second reference point based on a user input from the user interface, and automatically display changes made to the configuration based on differences between the network at the one reference point and the second reference point.

DETAILED DESCRIPTION OF THE INVENTION

Figure 1:
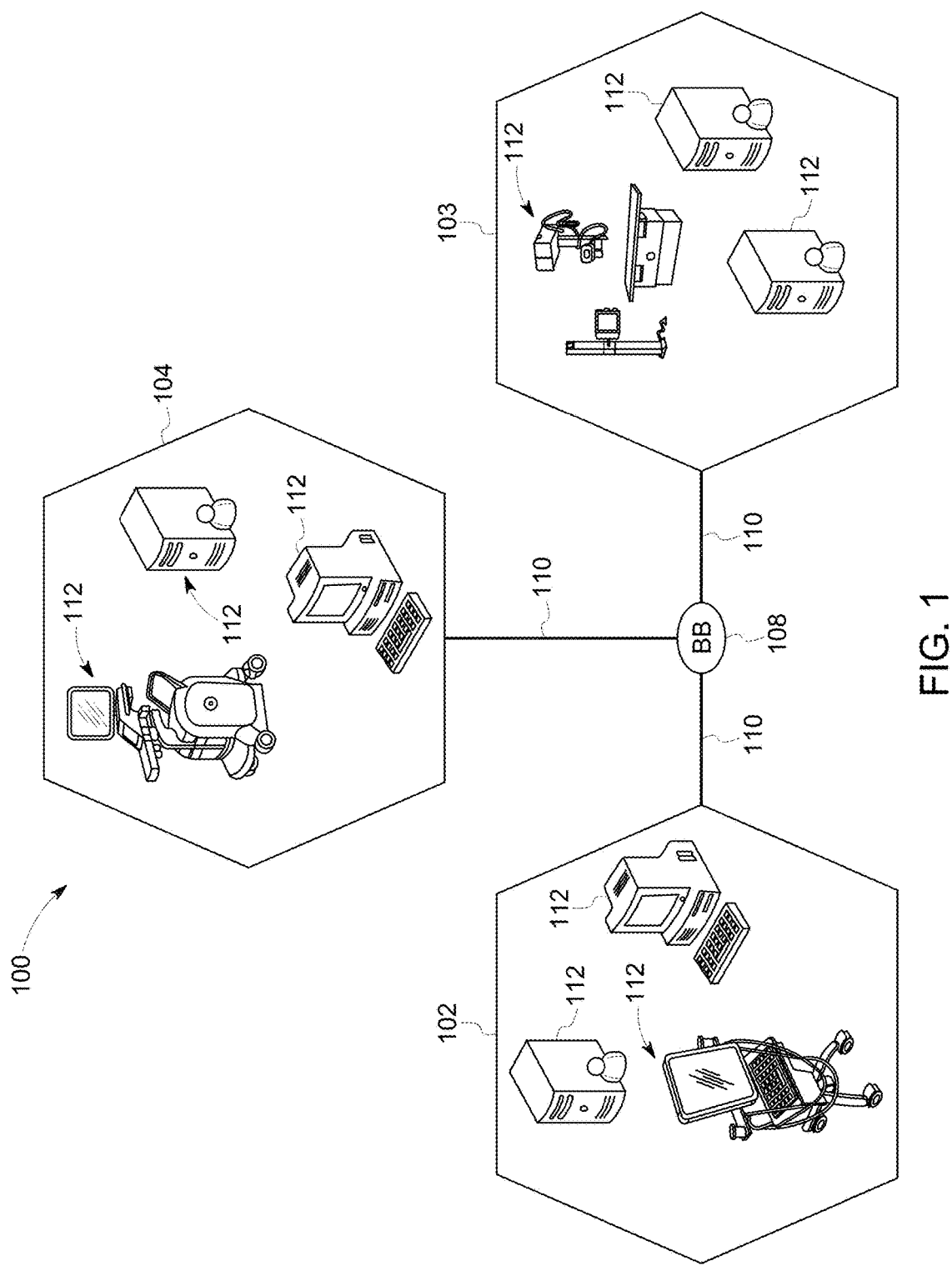
FIG. 1 is a diagram illustrating a medical network, in accordance with an embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments described herein generally relate to monitoring a network using a specialized graphical user interface (GUI) to manage, view, and troubleshoot the network. For example, embodiments herein provide a network managing interface for a user (e.g., information technology (IT) technician, network installer, and/or the like). The network managing interface may be a GUI configured to include one or more component markers representing bi-directional communication links, components and/or participants of the network. The one or more component markers of the network managing interface may be configured to inform the user on a status of the network. For example, the one or more component markers may be indicative of a network fault (e.g., bi-directional communication link fails, one of the components not exchanging data, and/or the like). Additionally or alternatively, the one or more component markers may enable the user to reconfigure the network. For example, establish and/or disconnect bi-directional communication links, add and/or remove system components (e.g., bus bridges) within the network, and/or the like. Optionally, the network managing interface may enable the user to select and/or view multiple components. For example, the network managing interface may sort various components of the network by type, display software and/or firmware information of one or more components of the network, display corresponding geographical and/or positional information of one or more components of the network, and/or the like. Additionally or alternatively, the network managing interface may display troubleshoot information based on the network fault.

In various embodiments, the network managing interface may display graphical information representing data usage within the network over time. The data usage can correspond to an amount of data exchanged (e.g., transmitted and/or received, throughput) between components of the network, versions (e.g., software version, hardware driver, and/or the like) of the components within the network, syntaxical mismatches within the network, processing loads (e.g., number of processors, CPU load, and/or the like) of individual components within the data flow of the network, and/or the like. For example, the network managing interface may generate a time graph representing an amount of data exchanged between two components along a bi-directional communication link. In another example, the network managing interface may overlay a heat map on one or more component markers representing the data usage of the components within the network.

A technical effect of at least one embodiment is increase serviceability and reduce management costs of the network by displaying network faults within a single interface. A technical effect of at least one embodiment decrease downtime for one or more components within the network by allowing the user to reconfigure the network from a single interface.

It should be noted that although the various embodiments may be described in connection with medical networks, the methods and systems may not be limited to the medical field, medical industry, and/or the like. In various embodiments of the methods and systems described herein may be implemented in connection with financial and/or commercial networks, telecommunication networks, industrial networks, and/or the like.

FIG. 1 illustrates a medical network 100 (e.g., a computer network) in which various embodiments may be implemented. The medical network 100 may correspond to multiples departments within a medical facility or multiple locations at different medical facilities. In the illustrated embodiment, the medical network 100 includes a plurality of nodes 102-104. The nodes 102-104 may represent a hub, server, router, switch, and/or the like. The nodes 102-104 may be communicatively coupled with each other along one or more bi-directional communication links 110. For example, the various nodes 102-104 may be connected within a local area network (LAN) or similar type of arrangement. The bi-directional communication links 110 may allow data (e.g., data packets) to be exchanged between the nodes 102-104. For example, the communication links 110 may be based on a wired and/or wireless network protocol (e.g., Wireless Medical Telemetry Service, Medical Body-Area Network, WiFi, 802.11, Bluetooth low energy, Bluetooth, Ethernet, and/or the like), optical communication (e.g., optical fiber, LED pulses, and/or the like), and/or the like.

The nodes 102-104 may each include one or more end points 112 interconnected within each corresponding node 102-104. The end points 112 may be configured to generate, process, and/or store data exchanged between the nodes 102-104. The end points 112 may be one or more medical devices, monitoring systems, terminals, and/or the like. The medical devices are operable to perform one or more medical examinations or scans of a patient. For example, the medical devices may include ultrasound imaging systems or devices, nuclear medicine imaging devices (e.g., Positron Emission Tomography (PET) or Single Photon Emission Computed Tomography (SPECT) imaging systems), Magnetic Resonance (MR) imaging devices, Computed Tomography (CT) imaging devices, and/or x-ray imaging devices, among others. The monitoring system may be configured to acquire physiological measurements of a patient. For example, the monitoring system may include one or more sensors (e.g., electrocardiograph (ECG) sensor, electroencephalograph (EER), a pulse oximeter, blood pressure monitor, and/or the like) that generate physiological data.

The network 100 may utilize a publisher and subscriber data address protocol, such a data distribution service (DDS) standard, which defines how data is exchanged between the nodes 102-104 within the network 100. It may be noted that one or more of the nodes 102-104 may be a publisher, a subscriber, and/or both. The data published by the nodes 102-104 may be generated by one or more of the end points 112 within the corresponding nodes 102-104. The data may be categorized based on the end point 112 generating the data, type of data (e.g., physiological data, medical images, patient data, waveform data and/or the like), data topic (e.g., temperature, location, pressure), and/or the like. The nodes 102-104 may subscribe to one or more of the data categories, which receives the published data that matches the data categories subscribed by the nodes 102-104.

The network may include one or more bus bridges 108. The bus bridge 108 may be configured to communicatively couple two or more nodes 102-104 together. For example, the bus bridge 108 is coupled to two or more of the bi-directional communication links 110, and configured to forward data between the nodes 102-104 along the bi-directional communication links 110. For example, the bus bridge 108 may forward data published by the first node 102 to one or more of the other nodes 103-104 within the network 100. Additionally or alternatively, the bus bridge 108 may filter data between the nodes 102-104 based on the data category of the published data and a rules database stored within a memory of the bus bridge 108. For example, the rule database may include a plurality of candidate categories with corresponding nodes 102-104 that can be forwarded the data. When the bus bridge 108 receives the published data, the bus bridge 108 may compare the category of the data with the rule database to determine which of the nodes 102-104 can be forwarded the published data. For example, the first node 102 publishes physiologic data, which is subscribed by the nodes 103-104. The bus bridge 108 receives the physiologic data from the first node 102 and compares the data category to the rule database, which defines that physiologic data published by the first node 102 can be forwarded to the node 103. Based on the rule database, the bus bridge 108 may forward the physiologic data to the node 103 and not to the node 104.

Figure 2:
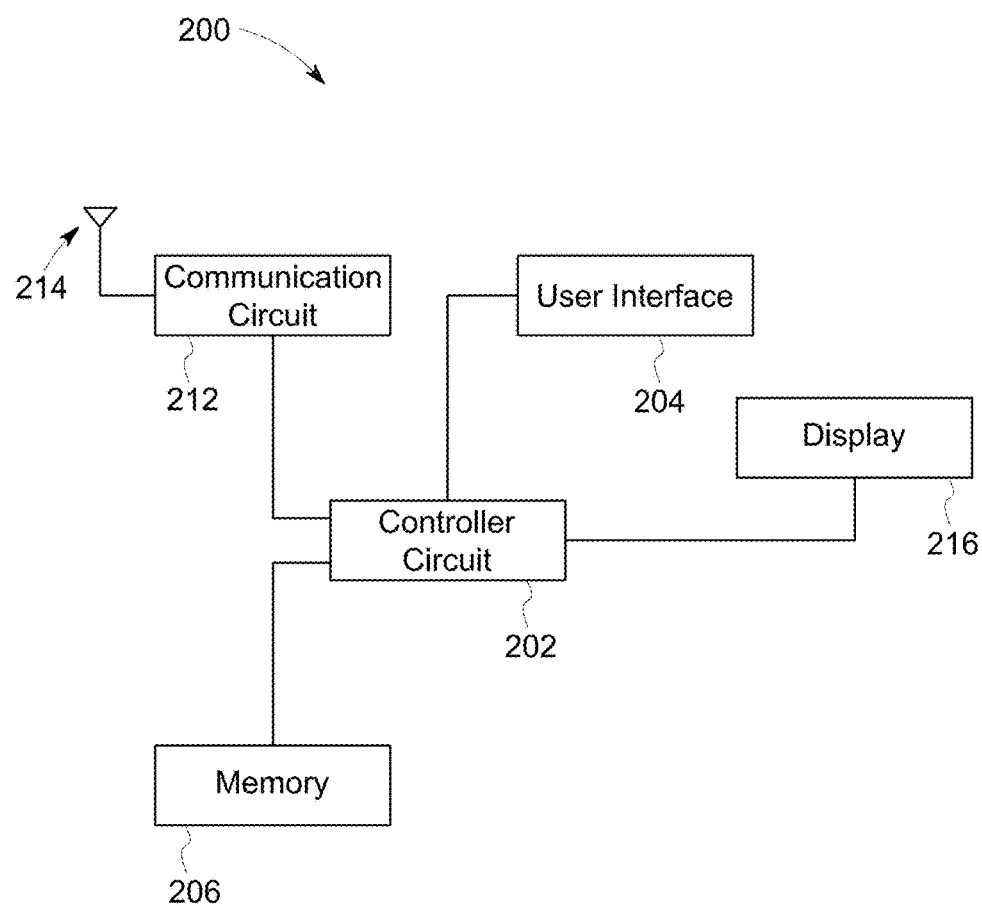
FIG. 2 is a schematic diagram of a network managing system, in accordance with an embodiment.

In connection with FIG. 2, the medical network 100 may be managed by a network managing system 200.

FIG. 2 is a schematic block diagram of the network managing system 200, in accordance with an embodiment. The system 200 may be a part of one of the nodes 102-104 of the network 100 (e.g., one of the end points 112 corresponding to a terminal), the communicatively coupled directly with the bus bridge 108, and/or the like. The system 200 may include a controller circuit 202 configured to control the operation of the system 200. The controller circuit 202 may include and/or represent one or more hardware circuits or circuitry that include, are connected with, or that both include and are connected with one or more processors, controllers, or other hardware logic-based devices. Additionally or alternatively, the controller circuit 202 may execute instructions stored on a tangible and non-transitory computer readable medium (e.g., memory 206) to perform one or more operations as described herein.

The controller circuit 202 may be operably coupled to and control a communication circuit 212. The communication circuit 202 is configured to receive network information from one or more components of the network 100 for a select time period (e.g., designated by the user via the user interface 204, predetermined time period, and/or the like). The communication circuit 212 may represent hardware that is used to transmit and/or receive data along a bi-directional communication link. The communication circuit 212 may include a transceiver, receiver, transceiver and/or the like and associated circuitry (e.g., antennas) 214 for wired and/or wirelessly communicating (e.g., communicating and/or receiving) with one or more end points 112, nodes 102-105, bus bridges 108, and/or the like based on a network protocol. For example, protocol firmware may be stored in the memory 206, which is accessed by the controller circuit 202. The protocol firmware provides the network protocol syntax for the controller circuit 202 to assemble data packets, establish and/or partition data received along the bi-directional communication links. Additionally or alternatively, the communication circuit 210 may include one or more LEDs transmit and/or a photodector to detect light for optical communication.

The controller circuit 202 may periodically receive network information to monitor the one or more components of the network. The network information is indicative of the operation status, configuration, and/or the like of the network 100 from the communication circuit 210. The controller circuit 202 may utilize a network monitoring protocol stored in the memory 206, such as the simple network management protocol, the common management information protocol, and/or the like to receive the network information from the one or more components of the network 100. For example, the controller circuit 202 may receive network information from one or more of the components within the network 100. The network information may include data usage of the components within the network 100. For example, the data usage may correspond to an amount of data exchanged (e.g., transmitted and/or received, throughput) along the along the bi-directional communication links 110 between components (e.g., the nodes 102-104 and/or the bus bridge 108) of the network 100, versions (e.g., software version, hardware driver, and/or the like) of the components within the network 100, syntaxical mismatches within the network 100, processing loads (e.g., number of processors, CPU load, and/or the like) of individual components within the data flow of the network, and/or the like over time. In another example, the control circuit 202 may further receive information on the one or more end points 112 within each of the nodes 102-104, such as a description of the end point 112, topic of the information transmitted by the end point 112, physical location of the one or more endpoints 112 within the nodes 102-104, subscription information (e.g., topics subscribed to) and/or the like.

The network information may be stored in the memory 206 by the controller circuit 202. For example, the controller circuit 202 may store the information within a network information database in the memory 206. The network information database may be organized based on the components of the network 100 with corresponding time information.

The controller circuit 202 may be operably coupled to a display 216 and a user interface 204. The display 216 may include one or more liquid crystal displays (e.g., light emitting diode (LED) backlight), organic light emitting diode (OLED) displays, plasma displays, CRT displays, and/or the like.

The user interface 204 controls operations of the controller circuit 202 and is configured to receive inputs from a user. The user interface 204 may include a keyboard, a mouse, a touchpad, one or more physical buttons, and/or the like. Optionally, the display 216 may be a touch screen display, which includes at least a portion of the user interface 204.

The user interface 204 may include hardware, firmware, software, or a combination thereof that enables an individual (e.g., a user) to directly or indirectly control operation of the system 200 and the various components thereof. The user interface 204 controls operations of the controller circuit 202 and is configured to receive inputs from the user. For example, the user interface 242 may include a keyboard, a mouse, a touchpad, one or more physical buttons, and/or the like.

A portion of the user interface 204 may correspond to a graphical user interface (GUI) generated by the controller circuit 202, which is shown on the display 216. The touch screen display can detect a presence of a touch from the operator on the display 216 and can also identify a location of the touch with respect to a surface area of the display 216. For example, the user may select one or more component markers shown on the display by touching or making contact with the display 216. The touch may be applied by, for example, at least one of an individual's hand, glove, stylus, or the like. In connection with FIG. 3, the GUI may be a network managing interface 300.

Figure 3:
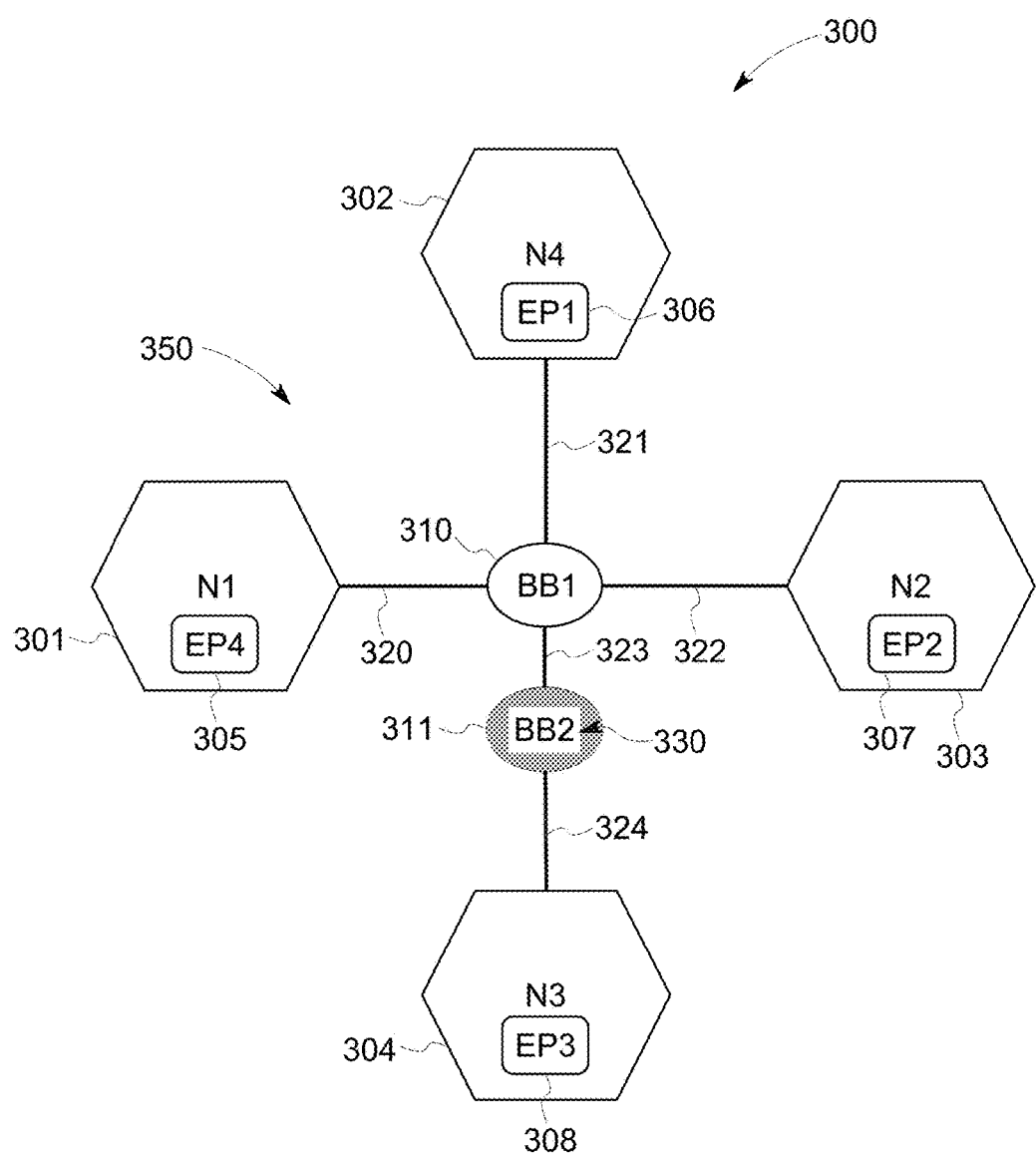
FIG. 3 is an illustration of a network managing interface, in accordance with an embodiment.

FIG. 3 is an illustration of a network managing interface 300, in accordance with an embodiment. The network managing interface 300 may utilize the network information acquired by the controller circuit 202 stored in the memory 206. The interface 300 communicates information to the user allowing the user to control and/or manage a medical network 350 by selecting one or more component markers (e.g., bi-directional communication links 320-324, nodes 301-304, end points 305-308, and/or bus bridges 310-311) of the interface 300. It may be noted that the medical network 350 may be similar to and/or the same as the medical network 100 shown in FIG. 1. It may be noted that although the various embodiments may be described in connection with medical networks, the methods and systems may not be limited to the medical field, medical industry, and/or the like.

The one or more component markers can be selected, manipulated, and/or activated by the user operating the user interface 204 (e.g., touch screen, keyboard, mouse). The component markers may be presented in varying shapes and colors, such as a graphical or selectable icons, a slide bar, a cursor, and/or the like. Optionally, one or more component markers may include text or symbols, such as a drop-down menu, a toolbar, a menu bar, a title bar, a window (e.g., a pop-up window) and/or the like. Additionally or alternatively, one or more component markers may indicate areas within the interface 300 for entering or editing information (e.g., component information, configuration information, labels), such as a text box, a text field, and/or the like.

The interface 300 includes component markers visually representing bi-directional communication links 320-324, nodes 301-304, end points 305-308, and/or bus bridges 310-311. The component markers are arranged to visually represent a topology of the network 350. For example, the interface 300 may represent a map of the components of the network 350 in real time. The topology of the network 350 corresponds to the arrangement and/or relationship of the various components with respect to each other that form the structure of the network 350. For example, the nodes 301-303 are communicatively coupled to each other via the bus bridge 310 along the bi-directional communication links 320-322.

Optionally, the user may select and/or move one or more component markers to adjust a topology of the network 350. For example, the controller circuit 202 may generate instructions to one or more components to adjust network configuration settings to conform to the adjusted topology. For example, the user may disconnect the bi-directional communication link 323 by removing the component marker corresponding to the link 323 on the interface 300. Based on the adjustment, the controller circuit 202 may generate instructions for the bus bridges 310-311 to terminate the link 323. Optionally, the user may adjust one of the bi-directional communication links 320-324 to be directly coupled to another component. For example, the user may adjust the bi-directional communication link 324 to disconnect from the bus bridge 311 and connect to the bus bridge 310. Based on the adjustment, the controller circuit 202 may generate instructions for the bus bridge 310 and the node 304 to terminate the links 323 and 324 and establish a new bi-directional communication link with each other. Optionally, the user may add additional components to the network 350. For example, the user mad add additional nodes, end points, and/or bus bridges.

Additionally or alternatively, one or more of the component markers may be selected by the user to view component information of the selected component marker (e.g., the nodes 301-304, end points 305-308, and/or bus bridges 310-311). The component information may include software and/or firmware information utilized by the component, current network configuration settings of the component (e.g., utilized by the component to establish a bi-directional communication link), location of the component (e.g., physical location 904 shown in FIG. 9), type of information published by the component, subscription information, and/or the like.

Optionally, the component markers may have visual status indicators (e.g., 330) representing an operational status of a component of the network 350. The visual status indicator may be a color (e.g., the visual status indicator 330 is the color red), an animation (e.g., scrolling, flashing), a graphical icon, and/or the like. The operational status may represent on whether the component of the network 350 is at fault. The fault can be a connection failure, no data transmitted within a predetermined time period (e.g., timeout, intermittent connection), internal errors (e.g., power failure, network protocol conflicts), routine issues, data type mismatch, and/or the like. For example, the fault may be caused by an amount of information exchanged between components, mismatch between versions of software and/or firmware utilized by the components, syntaxical mismatches between components of the network 350, processing loads of individual components of the network 350, and/or the like Additionally or alternatively, the user may select the component markers with the visual status indicator to receive troubleshoot information. The troubleshoot information may include instructions on how to resolve the fault. Optionally, the controller circuit 202 may generate the troubleshoot information based on the network information of the component. For example, the controller circuit 202 may compare one or more of the network configuration settings of the component with a default template stored in the memory 206. If the controller circuit 202 determines one or more select settings of the component that are different from the template, the controller circuit 202 may display troubleshoot information to adjust the one or more select settings. In another example, the controller circuit 202 may compare a version of the software and/or firmware utilized by the component with other components within the network 350. If there are conflicting versions, the controller circuit 202 may present troubleshoot information to update the software of the component.

Additionally, the controller circuit 202 may generate one or more time graphs (e.g., the time graph 400 shown in FIG. 4, the time graph 500 shown in FIG. 5, the time graph 600 shown in FIG. 6, the time graph 700 shown in FIG. 7, the time graph 800 shown in FIG. 8) in the network managing interface on the display 216 based on a selection of one or more component markers. The time graphs 400, 500, 600, 700, 800 may be indicative of the operation and/or configuration of a network (e.g., the medical network 350) over time.

Figure 4:
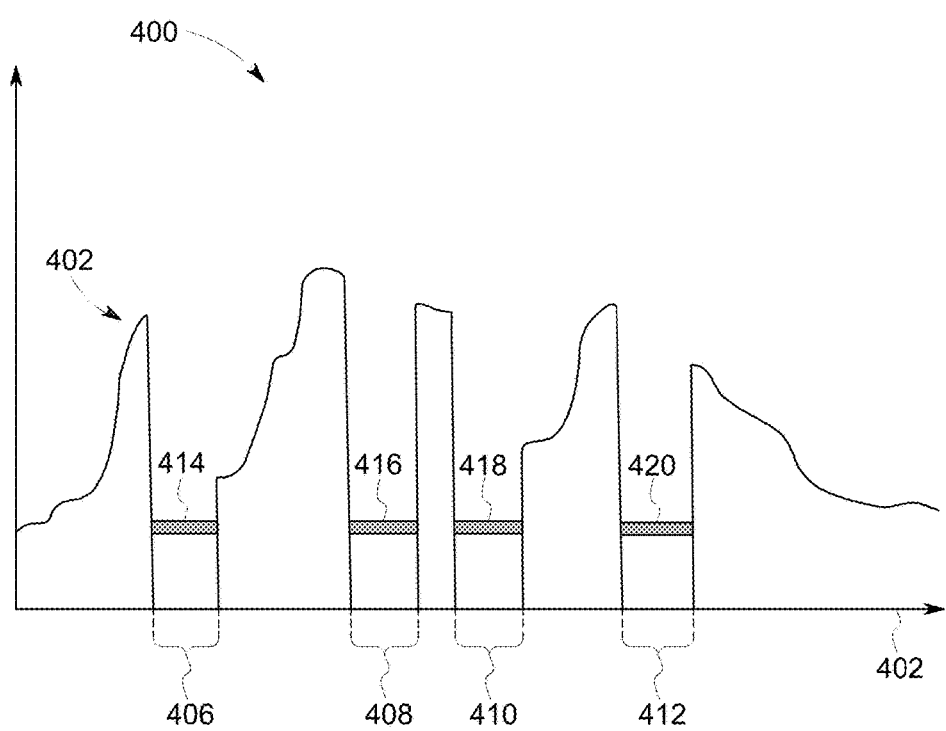
FIG. 4 is a time graph between a first and second end point of a network managing interface, in accordance with an embodiment.

In connection with FIG. 4, the time graph 400 may represent an amount of data exchanged between two selected components (e.g., nodes 301-304, end points 305-308) within the network 350 over time.

FIG. 4 illustrates the time graph 400 between a first and second end point 307-308, in accordance with an embodiment. The time graph 400 includes a data waveform 402 representing an amount of data exchanged (e.g., data throughput) between the first and second end points 307-308. The waveform 402 is plotted along a horizontal axis 402 representing time. The waveform 402 may represent a number of data packets, a data throughput, a data rate and/or the like of information exchanged between the first and second end points 307-308 over time.

A morphology and/or characteristics of the waveform 402 may be indicative of faults of the network 350. For example, an amplitude of the waveform 402, changes in slope and/or amplitude within a predetermined time period, and/or the like may indicate portions of the network 350 are not transmitting and/or receiving data. In connection with FIG. 4, the waveform 402 includes a plurality of dead regions 406, 408, 410, 412. The dead regions 406, 408, 410, 412 correspond to portions of the waveform 402 where no data is exchanged between the first and second end points 307-308. For example, the dead regions 406, 408, 410, 412 are interposed between portions of the waveform 402 where data is exchanged between the first and second end points 307-308. The dead regions 406, 408, 410, 412 are interposed between portions of the waveform 402 where data is exchanged, which is indicative of an intermittent connection and/or problems with the data flow between components within the network 350 (shown in FIG. 3). During an intermittent connection one or more of the bi-directional communication links 322-324 and/or intermediate components (e.g., the bus bridges 310-311) may switch between a fault and normal operation (e.g., forwarding published data). For example, one or more of the bi-directional communication links 322-324 and/or intermediate components may not be forwarding data published by the first end point 307 and/or the second end point 308 during the dead regions 406, 408, 410, 412.

Optionally, the controller circuit 202 may automatically position anchor points 414, 416, 418, 420 within the dead regions 406, 408, 410, 412. For example, the controller circuit 202 may determine when to position the anchor points 414, 416, 418, 420 based on a rule database stored in the memory 206. The rule database may include a plurality of morphology characteristics of a waveform, such as slope, amplitude, and/or the like that indicate a point of interest. Additionally or alternatively, the anchor points 414, 416, 418, 420 may be positioned by the user utilizing the user interface 204. Optionally, the user may add annotations, such as textual information to the one or more anchor points 414, 416, 418, 420.

The anchor points 414, 416, 418, 420 may correspond to a visual status indicator such as a color, a graphical animation (e.g., scrolling, flashing), a graphical icon, text (e.g., annotation) and/or the like on the time graph 400. The anchor points 414, 416, 418, 420 may correspond to time segments of the waveform 402 representing the points of interest determined by the controller circuit 202. The points of interest may be indicative of operational issues within the network 350. For example, the points of interest may correspond to portions of the waveform 402 indicative of a fault occurring in the network 350, such as during the dead regions 406, 408, 410, 412. Additionally or alternatively, the points of interest may correspond to portions of the waveform 402 indicative of potential choke-points. The choke-points may correspond to portions of the network having a high data rate over a predetermined threshold. For example, the controller circuit 202 may automatically position one or more anchor points at positions and/or portions of the waveform 402 that is over a predetermined threshold. Optionally, the visual status indicator of the anchor points 414, 416, 418, 420 may be indicative of the type of points of interest represented by the anchor points 414, 416, 418, 420. For example, a color (e.g., red) of the anchor points 414, 416, 418, 420 indicate that the associated points of interest correspond to a fault.

Figure 5:
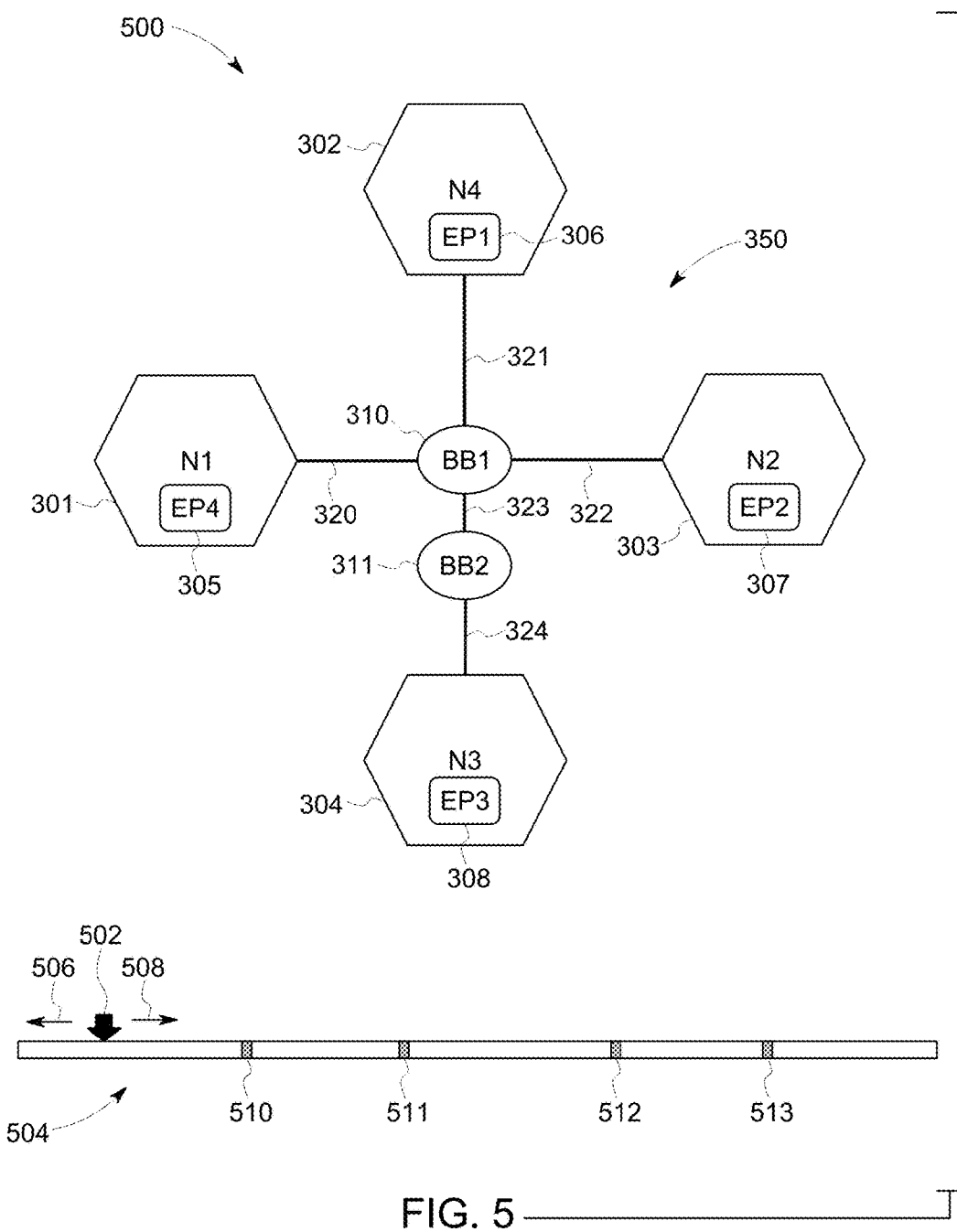
FIG. 5 is an illustration of a time graph of a network managing interface, in accordance with an embodiment.
Figure 6:
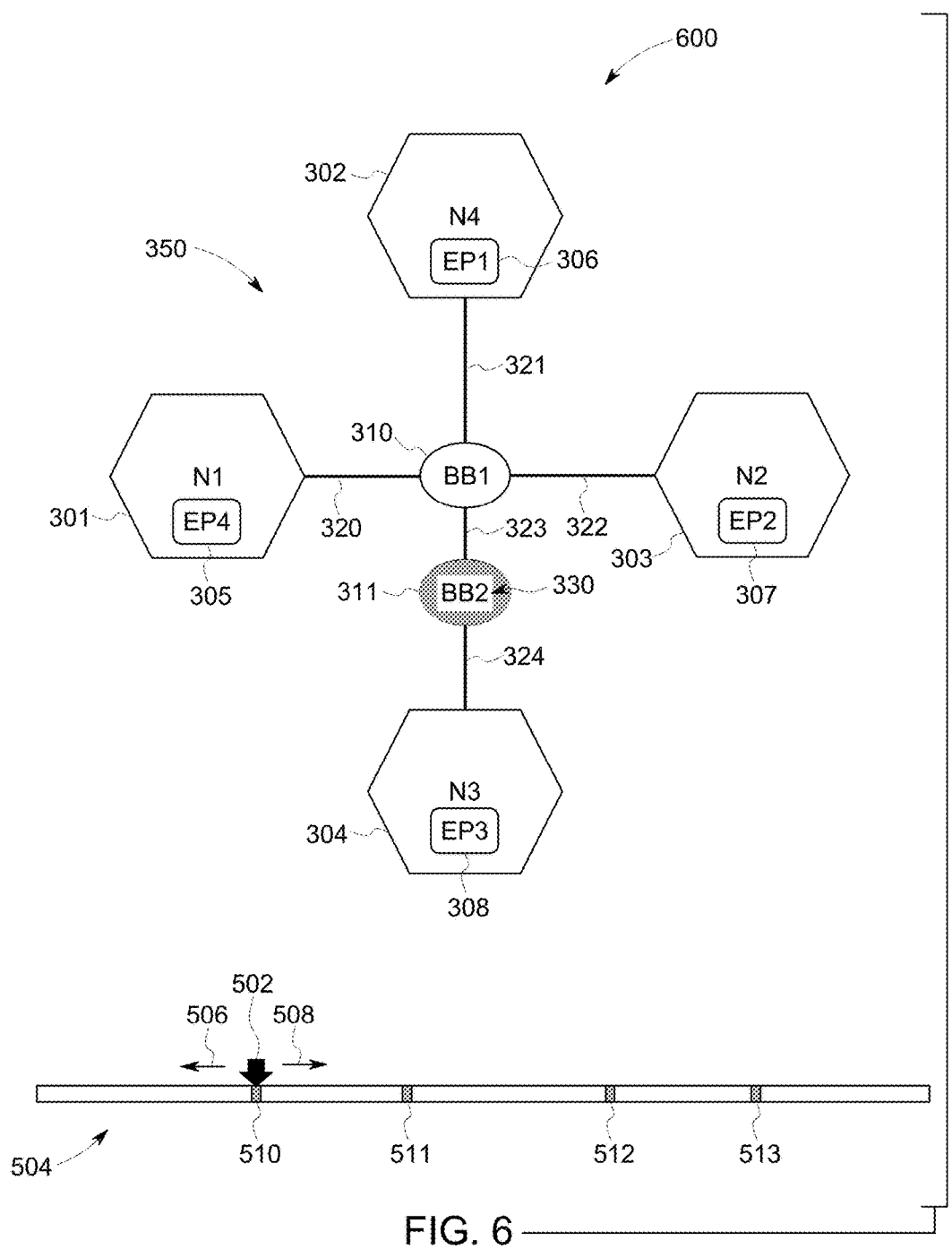
FIG. 6 is an illustration of a time graph of a network managing interface, in accordance with an embodiment.

FIGS. 5-6 illustrate the time graphs 500, 600, respectively, of the network 350, in accordance with an embodiment. The time graphs 500, 600 may represent an operational status and/or configuration of the components within the network 350 at different points along a time line 504 based on a position of a graphical indicator 502. The time line 504 may represent a time period of interest (e.g., a length of time) of the network information collected by the controller circuit 202. The amount of time of the time period of interest represented by the time line 504 may be defined by the user.

The graphical indicator 502 indicates the selected time of the time line 504 being shown in the time graph 500, 600. The graphical indicator 502 may be manipulated and/or adjusted by the user using the user interface 204. For example, the user may adjust a position of the graphical indicator 502 along the time line 504. The graphical indicator 502 may traverse along the time line 504 in a direction of the arrow 506, 508. The controller circuit 202 may update the component markers (e.g., the bi-directional communication links 320-324, the nodes 301-304, the end points 305-308, the bus bridges 310-311) shown in the time graphs 500, 600 based on a position of the graphical indicator 502 along the time line 504. The graphical indicator 502 is shown as a graphical icon of an arrow in FIGS. 5 and 6, however it may be noted in other embodiments the graphical indicator 502 may be a different graphical icon.

The time line 504 may include one or more anchor points 510-513. The anchor points 510-513 may be similar to and/or the same as the anchor points 414, 416, 418, 420 shown in FIG. 4. For example, the anchor points 510-513 may correspond to times of the time line 504 that correspond to points of interest. The points of interest may be indicative of operational issues within the network 350. The points of interest may correspond to one or more components of the network 350 not operational, such as in fault.

For example, in connection FIG. 5 the graphical indicator 502 is positioned not at one of the anchor points 510-513 along the time line 504. The time graph 500 displays the component markers visually representing the bi-directional communication links 320-324, the nodes 301-304, the end points 305-308, and the bus bridges 310-311. The component markers do not include a visual status indicator representing a fault.

In connection with FIG. 6, the user may reposition the graphical indicator 502 from the position shown in FIG. 5 along the time line 504 to a position corresponding to the anchor point 510. The controller circuit 202 may update the bi-directional communication links 320-324, the nodes 301-304, the end points 305-308, and the bus bridges 310-311 corresponding to the time at the graphical indicator 502. For example, the controller circuit 202 may add the visual status indicator 330 to the bus bridge 311.

Figure 7:
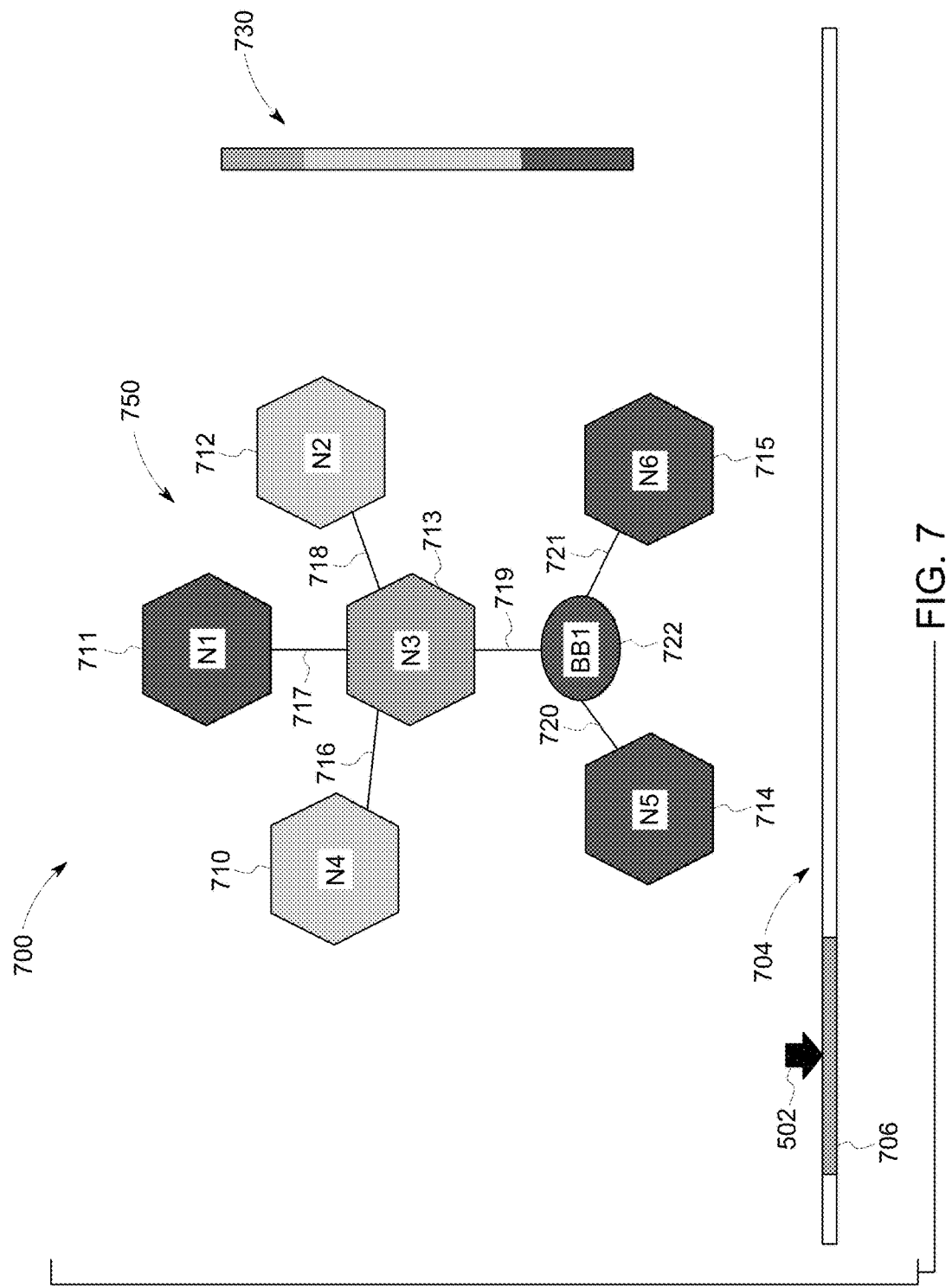
FIG. 7 is an illustration of a time graph of a network managing interface, in accordance with an embodiment.
Figure 8A:
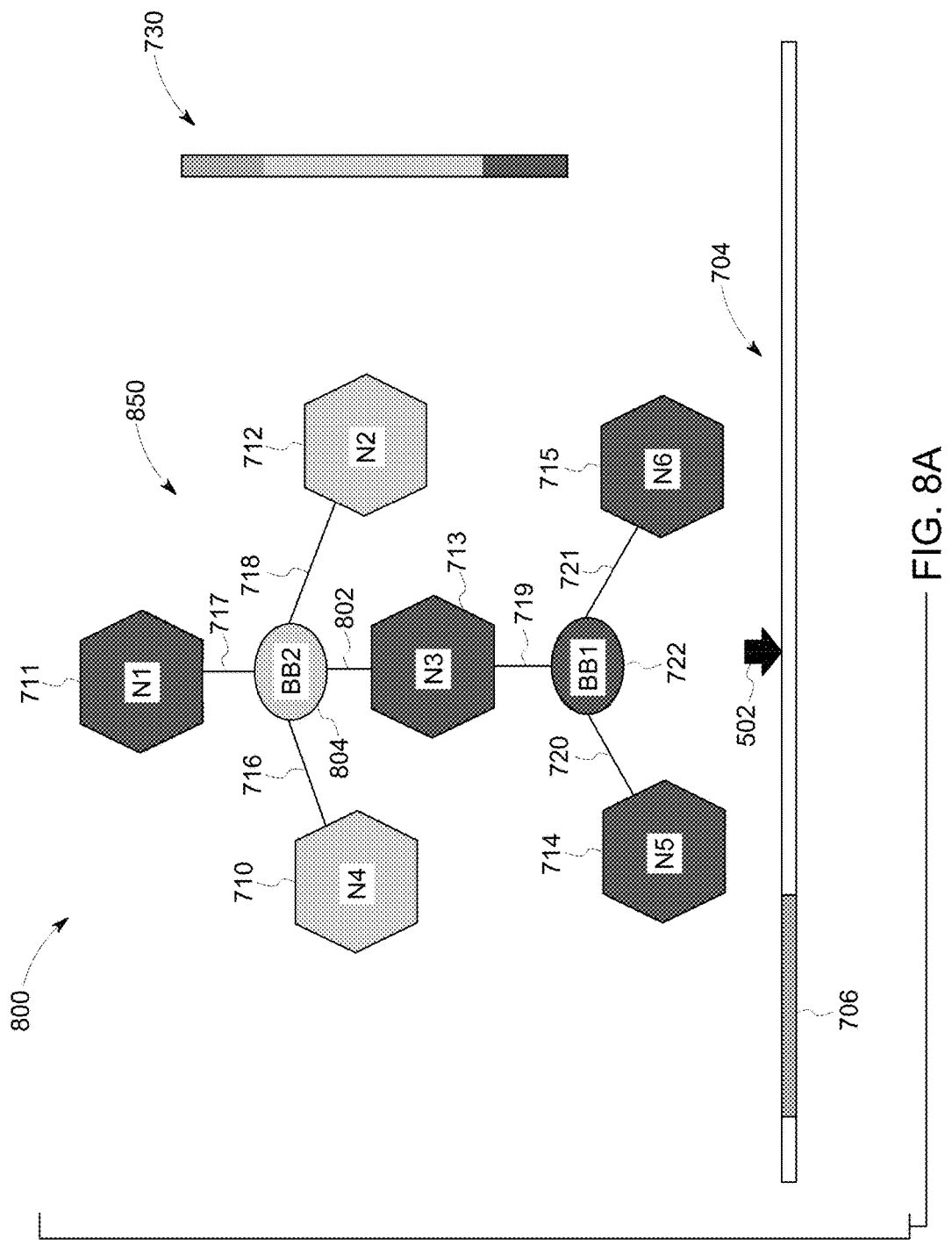
FIGS. 8A-B are illustrations of time graphs shown on network managing interfaces, in accordance with an embodiment
Figure 8B:
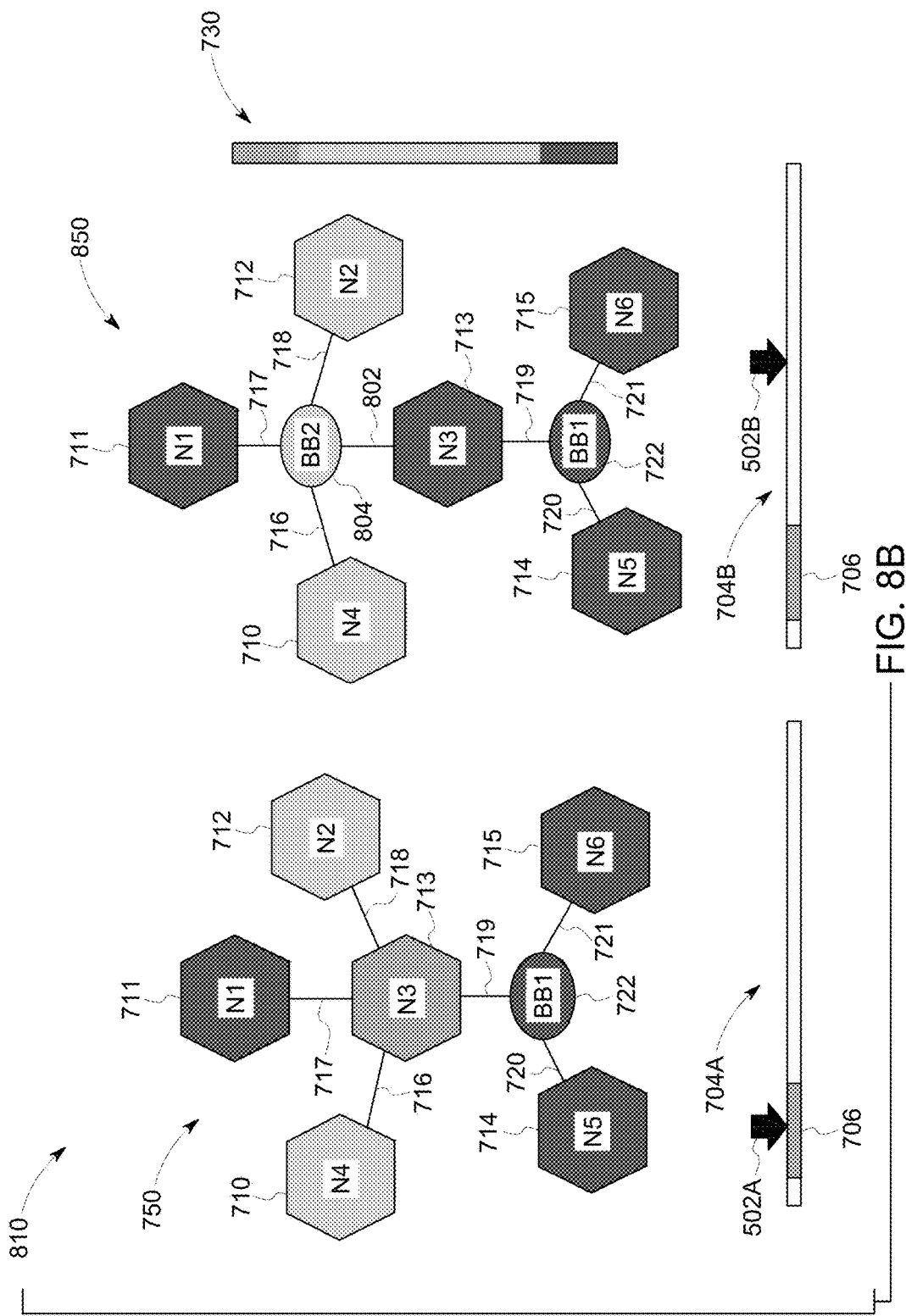

FIGS. 7, 8A and 8B illustrate the time graphs 700, 800 and 810, respectively, of medical networks 750, 850, in accordance with an embodiment. The time graphs 700, 800, 810 may be indicative of the data usage (e.g., an amount of information exchanged between components, versions of the components, syntaxical mismatches, processing loads of individual components, and/or the like) within the networks 750, 850. The networks 750, 850 may be similar to and/or the same as the network 350.

The controller circuit 202 may overlay a heat map to the component markers (e.g., nodes 710-715, bi-directional communication links 716-721, bus bridge 722) shown in the time graphs 700, 800. The heat map may be a visual status indicator of the component marker such as a color, an animation (e.g., scrolling, flashing), a graphical icon (e.g., the graphical icon 332), and/or the like. In connection with FIGS. 7 and 8, the heat map is based on a color scale or pattern defined by the color bar 730 representing data usage of the components within the networks 750, 850. The color bar 730 may define a range of colors. In one embodiment, the color bar 730 may be generated by the controller circuit 202 according to a predetermined formula stored in the memory 206. Each color representing an amount of data usage by each of the component markers of the networks 750, 850. For example, the color bar 730 may range from green, to yellow, and to red as the data usage increases. Optionally, a portion of the color bar 730 may correspond to an amount over a predetermined threshold indicative of a choke-point. A red color of the color bar 730 may represent the data usage is above a predetermined threshold corresponding to a choke-point. For example, the red color of the color bar 730 may represent an amount of data exchanged (e.g., being received and/or transmitted) at the component is above the predetermined threshold. In another example, the red color of the color bar 730 may represent a processing load at the component is above the predetermined threshold.

The time graphs 700, 800 may represent a heat map of the network 750, 850, respectively at different points along a time line 704 based on a position of the graphical indicator 502. The graphical indicator 502 indicates the selected time of the time line 504 being shown in the time graph 500, 600. The time line 704 may include one or more anchor points 706. The anchor points 706 may be similar to and/or the same as the anchor points 414, 416, 418, 420 shown in FIG. 4. For example, the anchor points 706 may correspond to times of the time line 704 that correspond to points of interest. The points of interest may be indicative of operational issues within the networks 750, 850. For example, the points of interest may correspond to one or more components within the network 750 having the data usage above the predetermine threshold, such as in the red based on the color bar 730.

In connection with FIG. 7, the graphical indicator 502 is positioned within the anchor point 706 along the time line 704. The time graph 700 displays the component markers (e.g., nodes 710-715, bi-directional communication links 716-721, bus bridge 722) each having a color and/or a color pattern visually representing the data usage by the component. For example, the bi-directional communication links 716 and 718 are generated by the controller circuit 202 having a yellow color, and the bi-directional communication links 717, 719-721 are generated by the controller circuit 202 having a green color. Based on the differences in color, the bi-directional communication links 716-721 are indicative that the amount of data traversing along the bi-directional communication links 716 and 718 is higher than the bi-directional communication links 717, 719-721.

In another example, the node 713 is generated by the controller circuit 202 having a red color indicating that the data usage at the node 713 is above the predetermined threshold which may correspond to a choke-point, configuration problem, and/or the like. Additionally or alternatively, the controller circuit 202 may automatically re-configure a topology of the network 750 based on the detection of the data usage above the predetermined threshold. For example, the controller circuit 202 may add a bus bridge (e.g., the bus bridge 804) to the network 750 to form the network 850. A position of the bus bridge may be based on the bi-directional communication links 716, 718 and/or the nodes 710, 712 communicatively coupled to the node 713. The controller circuit 202 may position the bus bridge 804 based on the differences in data usage of the components relative to each other. For example, the controller circuit 202 may couple the bus bridge 804 to the links 716, 718 positioning the bus bridge 804 between the nodes 710, 712 having the higher data usage relative to the link 719. It may be noted in other embodiments, the user may instruct the controller circuit 202 to add a bus bridge (e.g., the bus bridge 804) to the network 750 to form the network 850.

In connection with FIG. 8A, the user may reposition the graphical indicator 502 from the position shown in FIG. 7 along the time line 704 to a position outside of the anchor point 706. For example, the user may select a position along the time line 704 when the network 850 is formed. The controller circuit 202 may update the component markers, such as the node 713, the bus bridge 804, and the bi-directional communication link 802 to form the time graph 800 based on the network information corresponding to the position of the graphical indicator 502. The controller circuit 202 may automatically display changes made to the configuration based on differences between the network at the one reference point and the second reference point. For example, the controller circuit 202 adjusts the network 750 based on differences between the network 750 at the position of the graphical indicator 502 in FIG. 7 and the position of the graphical indicator 502 in FIG. 8. Differences between the networks 750 and 850 allows the user to understand and/or possibly rectify, modify, and/or the like a configuration or topology of the networks 750, 850. Additionally or alternatively, the time graph 800 may be indicative on the whether the configuration of the network 850 successively resolved the issues (e.g., choke-point at the node 713) of the network 750 shown in the time graph 700. For example, the heat map of the time graph 800 does not include component markers having a red color indicating that none of the components of the network 850 have a data usage over the predetermined threshold.

In connection with FIG. 8B, controller circuit 202 may generate the time graph 810 enabling the user to view two or more different times of the time lines 704a-b. The time graph 810 may display component markers representing a plurality networks (e.g., the networks 750, 850) in the display 216 concurrently and/or simultaneously. For example, the user may select a first position of the graphical indicator 502a along the time line 704a within the anchor point 706 and a second position of the graphical indicator 502b along the time line 704b corresponding to when the network 850 is formed. The controller circuit 202 may provide a side-by-side configuration, split screen configuration, and/or the like, which enables the display 216 to include the component markers of the networks 750 and 850 to be shown concurrently and/or simultaneously forming the time graph 810. It may be noted that the user may adjust a position of one and/or both of the graphical indicators 502a-b along the time lines 704a-b, respectively, independently with respect to each other.

Additionally or alternatively, the network managing interface may display a physical location of a selected component marker by the user. The physical location shown on the network managing interface may be a room and/or building number, a GPS location, an address, and/or the like. Optionally, in connection with FIG. 9, the physical location shown relative to a building plan.

Figure 9:
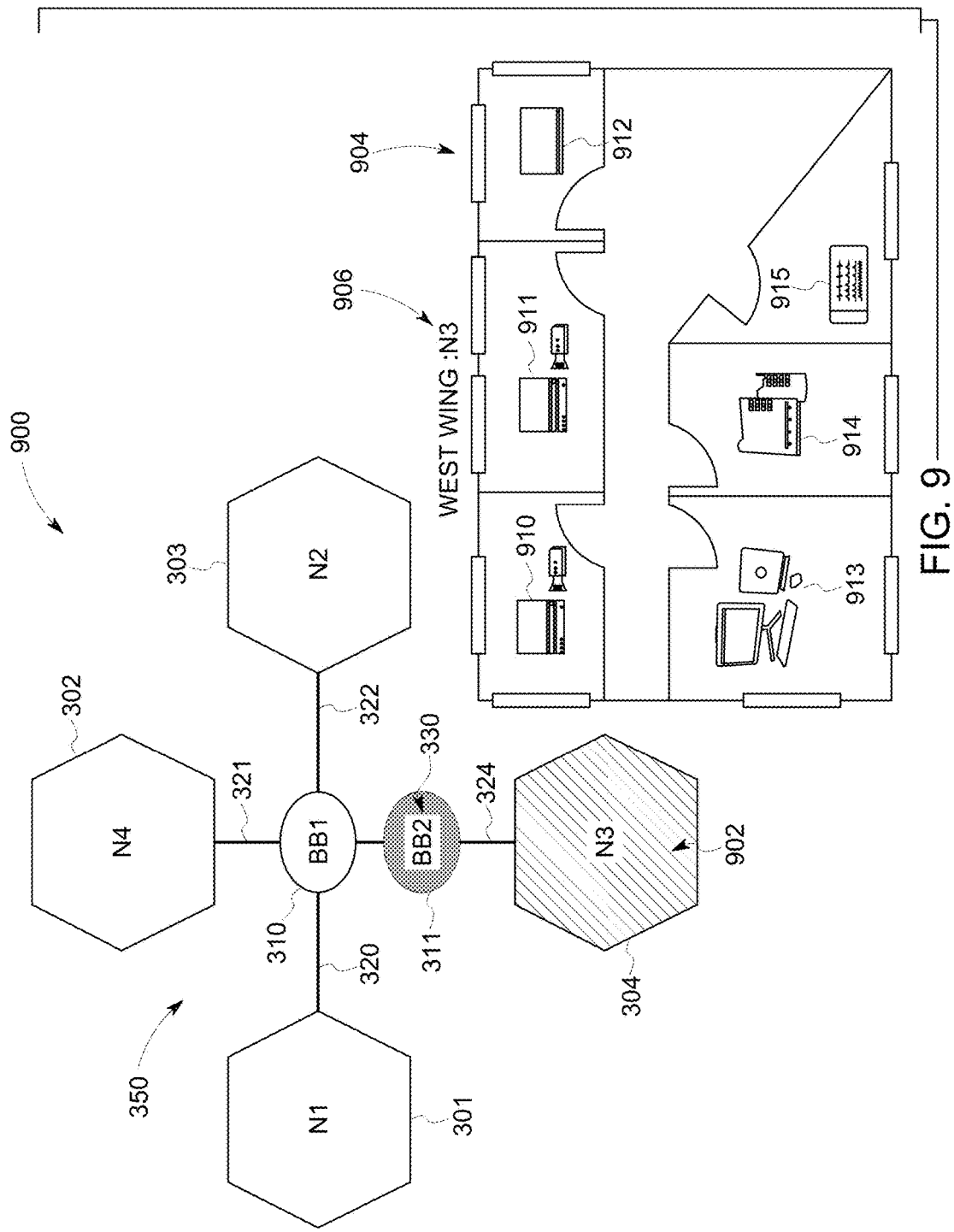
FIG. 9 is an illustration of a physical location of a selected component marker of a network managing interface, in accordance with an embodiment.

FIG. 9 is an illustration of a physical location 904 of a selected component marker of a network managing interface 900, in accordance with an embodiment. The user may select one of the component markers (e.g., bi-directional communication links 320-324, nodes 301-304, end points 305-308, and/or bus bridges 310-311) utilizing the user interface 204. When one of the component markers is selected, the controller circuit 202 may add a visual status indicator 902 to the selected component marker. For example, the visual status indicator 902 may add a color and/or color pattern to the component marker as shown in FIG. 9. Additionally or alternatively, the visual status indicator 902 may be an animation (e.g., scrolling, flashing), a graphical icon, and/or the like.

The physical location 904 may be based on network information received by the controller circuit 202. The physical location 904 is shown in FIG. 9 as a birdseye footprint or building plan. Optionally, the physical location 904 may be shown with textual information 906 providing further description of the physical location. The physical location 904 may further provide information on the physical environment of the selected component marker, such as room configuration, position within a room and/or building, proximity to other components, and/or the like.

The physical location 904 may further include information on components apart of and/or associated with the selected component marker. For example, the selected component marker is the node 304. The physical location 904 includes graphical representations 910-915 of the end points of the node 304. The graphical representations 910-915 provide positional information of the end points within the physical location 904.

Figure 10:
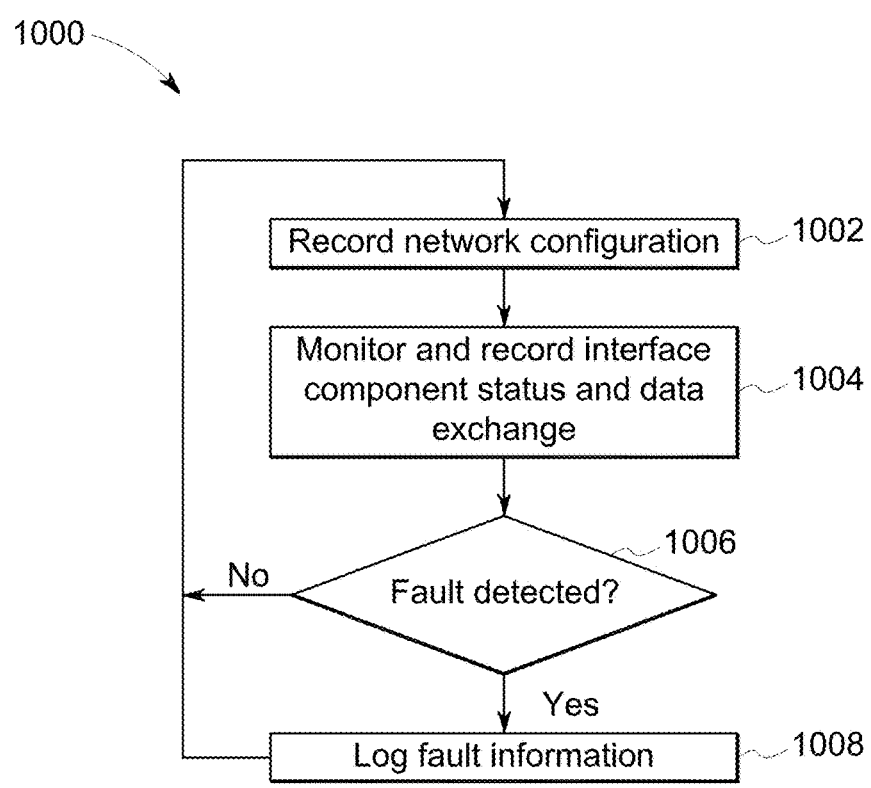
FIG. 10 is a flowchart of a method utilized by a network managing system to monitor a network, in accordance with an embodiment.

FIG. 10 illustrates a flowchart of a method 1000 utilized by a network managing system (e.g., the network managing system 200) to monitor a network, in accordance with an embodiment. The method 1000, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1000 may be used as one or more algorithms to direct hardware to perform one or more operations described herein. It should be noted, other methods may be used, in accordance with embodiments herein.

Beginning at 1002, the controller circuit 202 records a network configuration. The network configuration may correspond to the topology of the network (e.g., the network 100) based on the network information received by the controller circuit 202. For example, the controller circuit 202 may determine a configuration and data usage of the network (e.g., the network 100) based on the network information. The network information may include which nodes and/or bus bridges are directly coupled by a bi-directional communication link. Based on which components form the bi-directional communication link, the controller circuit 202 can determine the network configuration. For example, the network information may include information that the node 102 (FIG. 1) is directly coupled to the bus bridge 108 and the node 104 is directly coupled to the bus bridge 108 along respective bi-directional communication links 110. Based on the common component, the bus bridge 108, the controller circuit 202 may determine that the bus bridge is interposed between the nodes 102 and 104.

At 1004, the controller circuit 202 monitors and records an operational status and data exchange of one or more components of the network. The operational status and data exchange of the one or more components of the network is based on the network information received by the controller circuit 202. For example, the network information may include an amount of data transmitted and/or received (e.g., data throughput) along the bi-directional communication links 110, the nodes 102-104 and/or the bus bridge 108 over time.

At 1006, the controller circuit 202 determines whether a fault is detected. The fault can be a connection failure, no data transmitted within a predetermined time period (e.g., timeout, intermittent connection), internal errors (e.g., power failure, network protocol conflicts), routine issues, data type mismatch, and/or the like. The controller circuit 202 may determine whether one or more of the components are at fault based on the data usage contained within the network information. For example, the bus bridge 311 (FIG. 3) may not be re-transmitting (e.g., forwarding) published data received along the bi-directional communication links 323, 324. The controller circuit 202 may detect that the bus bridge 310 has not received any data along the bi-directional communication link 323 and/or the node 304 has not received data along the bi-directional communication link 324. Based on the network configuration determined at 1002, the controller circuit 202 may determine that the bus bridge 311 is interposed between the bus bridge 310 and the node 304. Further, the controller circuit 202 may determine that the bus bridge 311 has a connection failure based on data being exchanged at the bus bridge 311.

At 1008, the controller circuit 202 logs the fault information. The controller circuit 202 may record when a fault is detected and the component having the detected fault determined at 1006 in the memory 206. The operations of FIG. 10 can be repeated continuously or periodically to build a log of network information over time.

Figure 11:
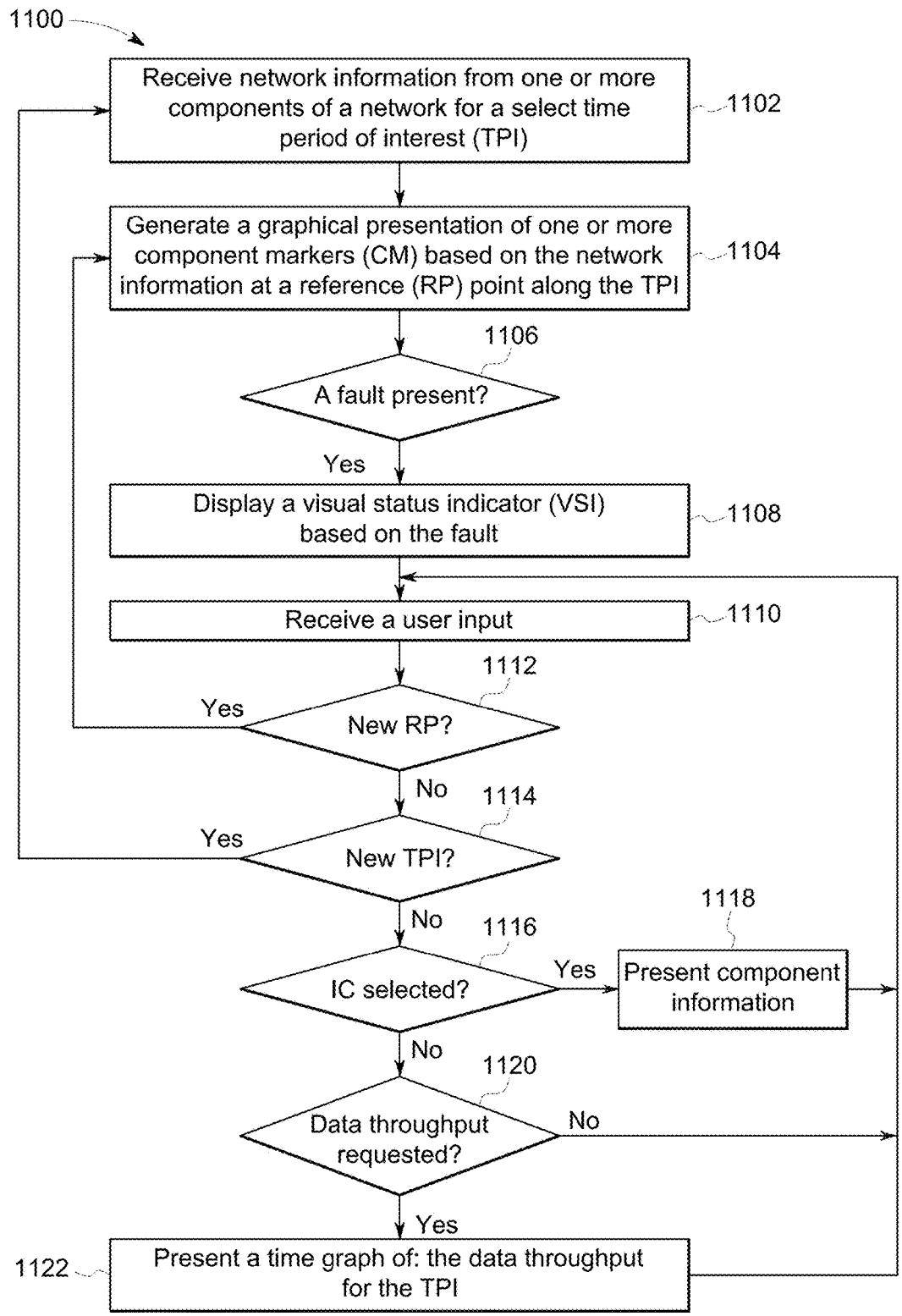
FIG. 11 is a flowchart of a method for a network managing interface, in accordance with an embodiment.

FIG. 11 is a flowchart of a method 1100 for a network managing interface (e.g., the interface 300), in accordance with an embodiment. The method 1100, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1000 may be used as one or more algorithms to direct hardware to perform one or more operations described herein. It should be noted, other methods may be used, in accordance with embodiments herein.

Beginning at 1102, the controller circuit 202 receives network information from one or more components of a network for a select time period of interest (TPI). In connection with the method 1000, the controller circuit 202 may monitor a network (e.g., the network 100) to receive network information over time. The controller circuit 202 may determine a configuration and data usage of the network (e.g., the network 100) based on the network information. The select TPI may be a subset of the total time the controller circuit 202 has received the network information. For example, the select TPI may be designated by the user via the user interface 204, a predetermined time period stored in the memory 206, and/or the like. Optionally, the controller circuit 202 may display a time line representing the select TPI. For example, in connection with FIGS. 5-6, the controller circuit 202 may display the timeline 504 representing the select TPI.

At 1104, the controller circuit 202 generates a graphical representation (e.g., component and interconnect map) of one or more component markers based on the network information at a reference point along the TPI. The component markers may be presented in varying shapes and colors, such as a graphical or selectable icons, a slide bar, a cursor, and/or the like shown on the display 216 interconnected with each other. The plurality of component markers representing the one or more components of the network (e.g., the network 350). For example, in connection with FIG. 3, the controller circuit 202 may generate a map illustrating the component markers visually representing bi-directional communication links 320-324, nodes 301-304, end points 305-308, and/or bus bridges 310-311. The controller circuit 202 may select a style (e.g., shape, size, and/or the like) of the component marker based on the type of component within the network. For example, the controller circuit 202 may generate component markers that represent the nodes to each have a similar and/or the same shape and/or size.

The reference point may correspond to a select time during the TPI. The select time may correspond to a position along the TPI. For example, the controller circuit 202 may indicate the reference point along the TPI as the graphical indicator 502 along the time line 504 shown in FIG. 5.

At 1106, the controller circuit 202 determines whether a fault is present. For example, in connection with 1006 of FIG. 10, the controller circuit 202 may determine if one or more of the components during the TPI has a fault based on the data usage within the network.

If a fault is present, at 1108 the controller circuit 202 displays a visual status indicator (VSI) based on the fault (e.g., overlay VSI with component marker). The visual status indicator may be a color (e.g., the visual status indicator 330 is the color red), an animation (e.g., scrolling, flashing), a graphical icon, and/or the like. For example, in connection with FIG. 3, the controller circuit 202 may determine that the bus bridge 311 is at fault during the TPI. The controller circuit 202 may overlay the visual status indicator 330, the color red, to the bus bridge 311 indicating that the bus bridge 311 is at fault. Additionally or alternatively, the controller circuit 202 may display the fault in reference to the TPI. For example, the controller circuit 202 may overlay one or more anchor points 510-513 (FIG. 5) to the time line 504 representing the TPI.

At 1110, the controller circuit 202 receives a user input. For example, the controller circuit 202 may receive the user input from the user interface 204 (FIG. 2), while the user views the VSIs and component markers (e.g., a map).

At 1112, the controller circuit 202 determines if the user input is indicative of a new reference point. For example, if the user input adjust a position of the graphical indicator 502 the controller circuit 202 may determine that the user input is indicative of a new reference point. If the user input is determined to be a new reference point, the controller circuit 202 returns to 1104.

If the user input is not indicative of a new reference point, then at 1114, the controller circuit 202 determines if the user input is indicative of a new TPI. For example, if the user input adjust the time line 504 the controller circuit 202 may determine that the user input is indicative of a new TPI. If the user input is determined to be a new TPI, the controller circuit 202 returns to 1102

If the user input is not indicative of a new TPI, then at 1116, the controller circuit 202 determines if the user input is indicative of a selection of a component marker. For example, if the user input selects one of the component markers (e.g., the bi-directional communication links 320-324, the nodes 301-304, the end points 305-308, the bus bridges 310-311) the controller circuit 202 may determine that the user input is indicative of an component marker selection.

If the user input is a selection of a component marker, then at 1118 the controller circuit 202 may present component information of the selected component marker. For example, in connection with FIG. 9, the controller circuit 202 may display a physical location 904 of the component represented by the select component marker. In another example, the controller circuit 202 may display a description of the type of information published by the component, software and/or configuration information of the component, subscription information, and/or the like.

At 1120, the controller circuit 202 determines if the user input is indicative of a data throughput request. For example, if the user input selects a plurality of component markers the controller circuit 202 may determine that the user input is indicative of a data throughput request.

If the user input is a data throughput request, then at 1122 the controller circuit 202 may present a time graph of the data throughput during the TPI. For example, in connection with FIG. 4, the controller circuit 202 may generate the time graph 400 having a data waveform 402 representing an amount of data exchanged between the plurality components represented by the selected component markers at 1120.

In an embodiment a system (e.g., for network monitoring) is provided. The system includes a communication circuit configured to receive network information from one or more components of a medical network for a select time period. The system includes a controller circuit having one or more processors coupled to the communication circuit. The controller circuit is configured to determine a configuration and data usage of the medical network based on the network information at reference points along the time period of interest. The controller circuit is further configured to generate a graphical representation of a topology of the medical network on a display based on the configuration of the medical network at one of the reference points. The graphical representation includes a plurality of component markers interconnected with each other. The plurality of component markers represent the one or more components. The graphical representation includes a visual status indicator for the one or more components based on the data usage.

Optionally, the controller circuit is configured to determine a fault of a select component of the network based on the network information, and overlay a visual status indicator to a first component marker representing the select component, wherein the visual status indicator is indicative of the fault. Additionally or alternatively, the system includes a user interface. The controller circuit may receive a user selection of the first component marker. The controller circuit may be configured to generate troubleshoot information for the fault based on the network information. Additionally or alternatively, the controller circuit is configured to adjust the configuration of the network based on the fault.

Optionally, the controller circuit is configured to generate a time graph of the network based on the network information. The time graph may have a time line defined by the time period of interest. The time graph may include a graphical indicator positioned along the time line. A position of the graphical indicator may be based on the one of the reference points. Additionally or alternatively, a first component marker of the time graph includes a visual status indicator. The visual status indicator may represent an amount of data usage a select component represented by the first component marker. Additionally or alternatively, the time line includes an anchor point positioned by the controller circuit or based on a user input received from a user interface. Additionally or alternatively, the system includes a user interface. The controller circuit may receive a user selection adjusting a position of the graphical indicator to a second reference point. Additionally or alternatively, the controller circuit may adjust the configuration based on the second reference point and the network information.

Optionally, the system includes a user interface. The controller circuit may receive a user selection of a first component marker. The controller circuit may be configured to display a physical location of a select component represented by the first component marker. Additionally or alternatively, the physical location represents a position of the select component relative to a building plan.

Optionally, the system includes a user interface. The controller circuit may receive a user selection of a first and second component marker. The controller circuit may be configured to generate a time graph having a data waveform representing an amount of data exchanged between a first and second component represented by the first and second component marker.

Optionally, the system includes a user interface. The controller circuit may receive a user selection adjusting a first component with respect to the configuration of the network. The controller circuit may be configured to generate instructions for the first component based on the user selection.

In at least one embodiment a method (e.g., for network monitoring) is provided. The method includes receiving network information from one or more components of a medical network for a select time period. The method also includes determining a configuration and data usage of the medical network based on the network information at reference points along the time period of interest, and generating a graphical representation of a topology of the medical network on a display based on the configuration of the medical network at one of the reference points. The graphical representation includes a plurality of component markers interconnected with each other. The plurality of component markers represent the one or more components. The graphical representation includes a visual status indicator for the one or more components based on the data usage.

Optionally, the method includes determining a fault of a select component of the network based on the network information, and overlaying a visual status indicator to a first component marker representing the select component. The visual status indicator is indicative of the fault. Additionally or alternatively, the method includes generating troubleshoot information for the fault based on the network information. Additionally or alternatively, the method includes adjusting the configuration of the network based on the fault.

Optionally, the method includes generating a time graph of the network based on the network information. The time graph may have a time line defined by the time period of interest. The time graph may include a graphical indicator positioned along the time line. A position of the graphical indicator may be based on the one of the reference points.

Additionally or alternatively, the method includes adjusting a position of the graphical indicator to a second reference point based on a user input, and adjusting the configuration based on the second reference point and the network information.

In at least one embodiment a system (e.g., for network monitoring) is provided. The system includes a communication circuit configured to receive network information from one or more components of a network for a select time period. The system includes a user interface and a controller circuit having one or more processors coupled to the communication circuit. The controller circuit is configured to determine a configuration and data usage of the network based on the network information at reference points along the time period of interest. The controller circuit is further configured to generate a graphical representation of a topology of the network on a display based on the configuration of the network at one of the reference points. The graphical representation includes a plurality of component markers interconnected with each other. The plurality of component markers represent the one or more components. The graphical representation includes a visual status indicator for the one or more components based on the data usage. The controller circuit is further configured to generate a time graph of the network based on the network information. The time graph having a time line defined by the time period of interest. The time graph includes a graphical indicator positioned along the time line. A position of the graphical indicator is based on the one of the reference points. The controller circuit is further configured to adjust a position of the graphical indicator to a second reference point based on a user input from the user interface, and automatically display changes made to the configuration based on differences between the network at the one reference point and the second reference point.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A system, comprising:
   a communication circuit configured to receive network information from one or more components of a network for a select time period;
   a controller circuit having one or more processors coupled to the communication circuit, the controller circuit configured to:
      determine a configuration and data usage of the network based on the network information at reference points along the time period of interest;
      generate a graphical representation of a topology of the network on a display based on the configuration of the network at one of the reference points, wherein the graphical representation includes a plurality of component markers interconnected with each other, the plurality of component markers representing the one or more components, the graphical representation includes a visual status indicator for the one or more components based on the data usage; and
      generate a time graph of the network based on the network information, the time graph having a time line defined by the time period of interest, the time graph includes a graphical indicator positioned along the time line, wherein a position of the graphical indicator is based on the one of the reference points, wherein a first component marker of the time graph includes a visual status indicator, the visual status indicator represents an amount of data usage a select component represented by the first component marker.

2. The system of claim 1, wherein the controller circuit is configured to:
   determine a fault of a select component of the network based on the network information; and
   overlay a visual status indicator to a first component marker representing the select component, wherein the visual status indicator is indicative of the fault.

3. The system of claim 2, further comprising a user interface, wherein the controller circuit receives a user selection of the first component marker, the controller circuit configured to generate troubleshoot information for the fault based on the network information.

4. The system of claim 2, wherein the controller circuit is configured to adjust the configuration of the network based on the fault.

5. The system of claim 1, wherein the time line includes an anchor point positioned by the controller circuit or based on a user input received from a user interface.

6. The system of claim 1, further comprising a user interface, wherein the controller circuit receives a user selection adjusting a position of the graphical indicator to a second reference point.

7. The system of claim 6, the controller circuit adjusting the configuration based on the second reference point and the network information.

8. The system of claim 1, further comprising a user interface, wherein the controller circuit receives a user selection of a first component marker, the controller circuit configured to display a physical location of a select component represented by the first component marker.

9. The system of claim 8, wherein the physical location represents a position of the select component relative to a building plan.

10. The system of claim 1, further comprising a user interface, wherein the controller circuit receives a user selection of a first and second component marker, the controller circuit configured to generate a time graph having a data waveform representing an amount of data exchanged between a first and second component represented by the first and second component marker.

11. The system of claim 1, further comprising a user interface, wherein the controller circuit receives a user selection adjusting a first component with respect to the configuration of the network, the controller circuit configured to generate instructions for the first component based on the user selection.

12. A method comprising:
receiving network information from one or more components of a network for a select time period;
determining a configuration and data usage of the network based on the network information at reference points along the time period of interest;
generating a graphical representation of a topology of the network on a display based on the configuration of the network at one of the reference points, wherein the graphical representation includes a plurality of component markers interconnected with each other, the plurality of component markers representing the one or more components, the graphical representation includes a visual status indicator for the one or more components based on the data usage;
generating a time graph of the network based on the network information, the time graph having a time line defined by the time period of interest, the time graph includes a graphical indicator positioned along the time line, wherein a position of the graphical indicator is based on the one of the reference points;
adjusting a position of the graphical indicator to a second reference point based on a user input; and
adjusting the configuration based on the second reference point and the network information.

13. The method of claim 12, further comprising:
determining a fault of a select component of the network based on the network information; and
overlaying a visual status indicator to a first component marker representing the select component, wherein the visual status indicator is indicative of the fault.

14. The method of claim 13, further comprising generating troubleshoot information for the fault based on the network information.

15. The method of claim 13, further comprising adjusting the configuration of the network based on the fault.

16. A system comprising:
a communication circuit configured to receive network information from one or more components of a network for a select time period;
a user interface;
a controller circuit having one or more processors coupled to the communication circuit, the controller circuit configured to:
determine a configuration and data usage of the network based on the network information at reference points along the time period of interest;
generate a graphical representation of a topology of the network on a display based on the configuration of the network at one of the reference points, wherein the graphical representation includes a plurality of component markers interconnected with each other, the plurality of component markers representing the one or more components, the graphical representation includes a visual status indicator for the one or more components based on the data usage;
generate a time graph of the network based on the network information, the time graph having a time line defined by the time period of interest, the time graph includes a graphical indicator positioned along the time line, wherein a position of the graphical indicator is based on the one of the reference points;
adjust a position of the graphical indicator to a second reference point based on a user input from the user interface; and
automatically display changes made to the configuration based on differences between the network at the one reference point and the second reference point.

* * * * *